Patented June 24, 1930

1,766,714

UNITED STATES PATENT OFFICE

GEORGE S. LEWIN, OF SANTA MONICA, AND CHARLES A. LOGUE, OF VENICE, CALIFORNIA

DEHYDRANT FOR ELECTRIC INSULATORS AND CONTACT POINTS AND METHOD FOR RESTORING NORMAL ELECTRIC CONDITIONS

No Drawing. Application filed July 11, 1927. Serial No. 205,033.

Our invention relates to a method of restoring normal electric conditions in high tension electric devices such as magnetos, distributors, spark plugs and the like in auto vehicles which have been short circuited by water, and a composition of matter used in such treatment.

As well known, considerable trouble is often experienced in the starting of the engines of motor vehicles due to water being in contact with the contact parts of distributors, magnetos and the like. One drop of water, even moisture due to condensation, is sufficient to short such high tensioned currents as used in modern motor vehicles.

The present practice for removing the water from such devices is to apply air, either hot or cold, heat, wiping with alcohol, or even baking in an oven of parts that can be removed, in order to evaporate or expel the water. In our method it is merely necessary to apply our composition to the parts affected by the water and normal electric conditions enabling the engine to be started immediately will be restored.

Our invention consists in the steps of the process and the composition of matter hereinafter described and claimed.

The composition is compounded as follows:

A volatile or partially volatile hydrocarbon, such as derived from mineral oil, and having a gravity of from 38 to 72 degrees, is mixed with a chlorinated compound, such as carbon tetra-chloride in order to render the same non-inflammable. We find that using one-third of the carbon tetra-chloride of the mixture will answer the purpose. We add a small quantity of water soluble oil of pine, 1/10 of 1 percent being sufficient. The oil of pine serves as an emulsifying agent when the mixture is brought in contact with water. About the same quantity of glycerine is also added, the glycerine being hygroscopic, absorbing the water. The glycerine may be omitted and also the oil of pine but the composition is much more efficient when either or both are added to the mixture. If desired, the liquid may be colored and a deodorant added thereto.

In the use of the composition from two to four ounces are applied to the electrical parts which, on account of the presence of water, are short circuited. We are not prepared to state the exact physical or chemical action that takes place but it will be appreciated that on account of the penetrating qualities of the composition the water may be displaced physically, which displacement is probably assisted by the oil of pine and the glycerine. The composition being highly volatile, it will evaporate in a very short time and the engine of the motor vehicle may be started without any difficulty, practically immediately after applying the composition.

Various changes may be made in the composition of the matter by those skilled in the art without departing from the spirit of our invention as claimed.

We claim:

1. A dehydrant composition to restore normal conditions of electric contact points and the like in internal combustion engines which have been temporarily short circuited by the presence of water, comprising at least a partially volatile hydrocarbon, carbon tetrachloride in quantity sufficient to render the hydrocarbon non-inflammable, 1/10 of 1% of water soluble oil of pine, and 1/10 of 1% of glycerine.

2. A dehydrant composition to restore normal conditions of electric contact points and the like in internal combustion engines which have been temporarily short circuited by the presence of water, comprising volatile hydrocarbon, an agent to render the same non-inflammable, and a small percentage of a hygroscopic agent.

3. A dehydrant composition to restore normal conditions of electric contact points and the like in internal combustion engines which have been temporarily short circuited by the presence of water, comprising volatile hydrocarbon, an agent to render the same non-inflammable, and an emulsifying agent.

4. A method of restoring normal conditions in electric apparatus temporarily short circuited by the presence of water comprising applying to contact points of such electric apparatus a volatile solution containing a non-inflammable hydrocarbon derivative.

5. A method of restoring normal conditions in electric apparatus temporarily short circuited by the presence of water comprising applying to contact points of such electric apparatus a volatile solution containing a non-inflammable hydrocarbon derivative, and a small percentage of an emulsifier.

6. A method of restoring normal conditions in electric apparatus temporarily short circuited by the presence of water comprising applying to contact points of such electric apparatus a volatile solution containing a non-inflammable hydrocarbon derivative, a small percentage of an emulsifier, and a small percentage of a hygroscopic agent.

7. The process of reconditioning electric circuits which have been short-circuited by an electrically conducting liquid which consists in applying at the place of short circuit an electrically non-conducting chemical agent for counteracting the short-circuiting tendency of said liquid.

8. The process of reconditioning electric circuits which have been short-circuited by an electrically conducting liquid which consists in applying at the place of short circuit an electrically non-conducting non-inflammable chemical agent for counteracting the short-circuiting tendency of said liquid.

9. The process of reconditioning electric circuits which have been short-circuited by an electrically conducting liquid which consists in applying carbon tetrachloride at the place of short circuit for counteracting the short-circuiting tendency of said liquid.

10. The step in the process of starting internal combustion engines having an electric circuit which has been short-circuited by an electrically conducting liquid which consists in applying at the place of short circuit an electrically non-conducting chemical agent for counteracting the short circuiting tendency of said liquid.

11. The step in the process of starting internal combustion engines having an electric circuit which has been short-circuited by water which consists in applying at the place of short circuit an electrically non-conducting non-inflammable chemical agent for counteracting the short-circuiting tendency of said water.

In testimony whereof we have signed our names to this specification.

GEORGE S. LEWIN.
CHARLES A. LOGUE.